Figure 3:
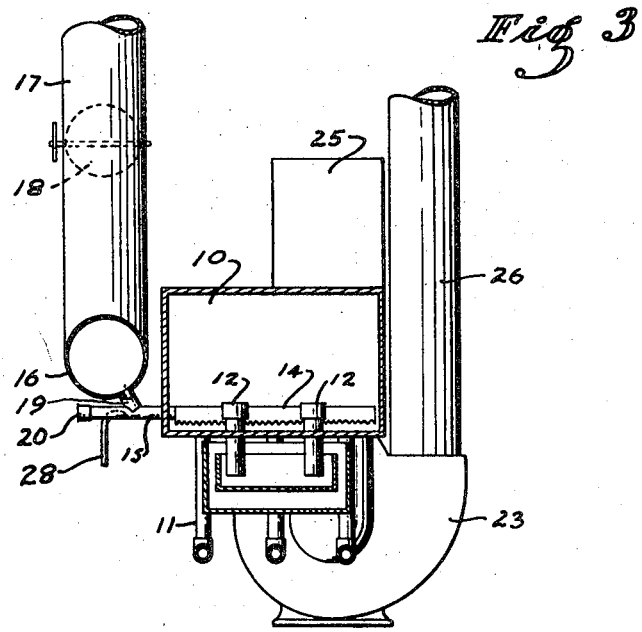

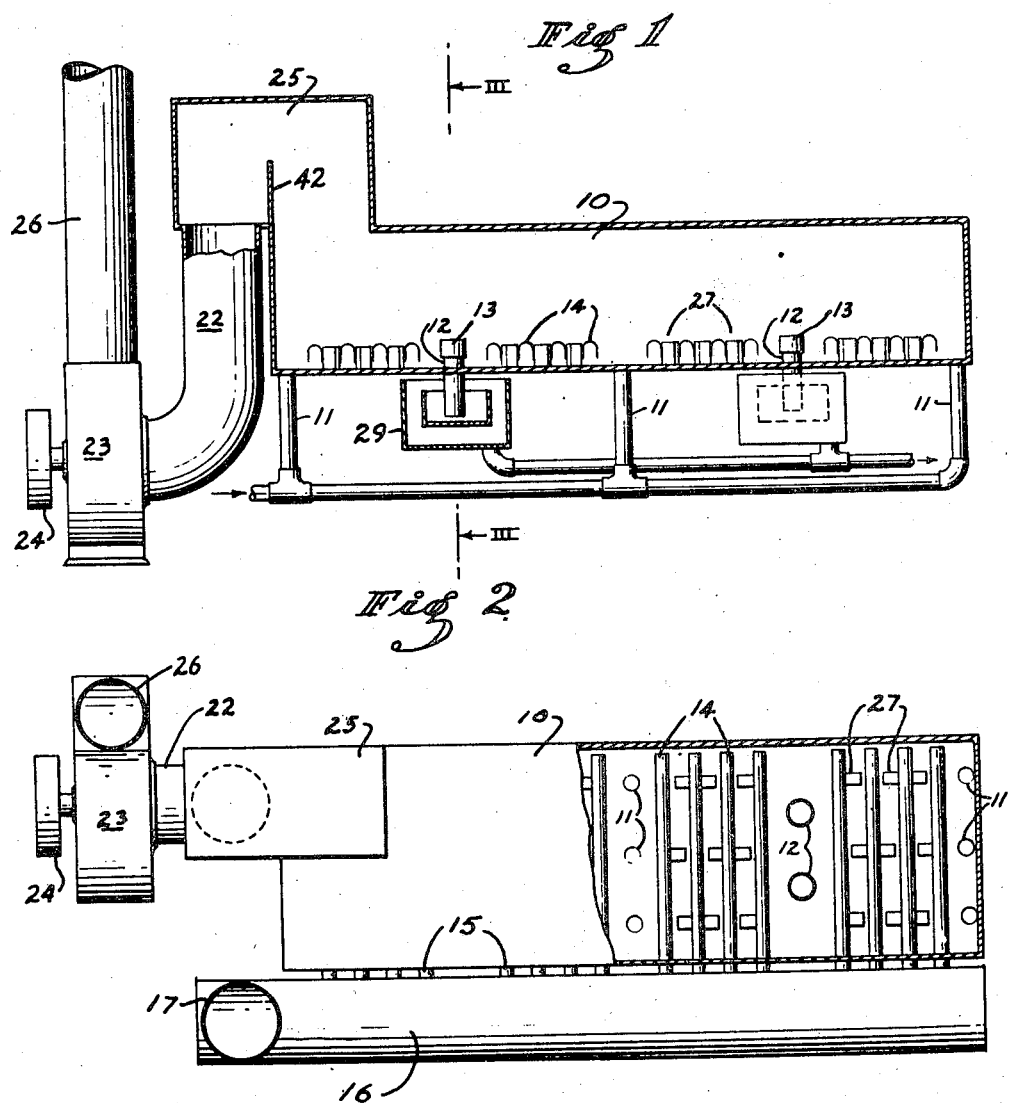

Jan. 27, 1948.    T. WOODWARD ET AL    2,434,976
APPARATUS FOR EFFECTING HEAT EXCHANGE BETWEEN A GAS AND A LIQUID
Filed Oct. 2, 1944    3 Sheets-Sheet 2

INVENTORS
TEYNHAM WOODWARD
ARTHUR W VETTEL &
HENRY F SCANDRETT
BY James E. Toomey, Agt.

Jan. 27, 1948.  T. WOODWARD ET AL  2,434,976
APPARATUS FOR EFFECTING HEAT EXCHANGE BETWEEN A GAS AND A LIQUID
Filed Oct. 2, 1944  3 Sheets-Sheet 3

INVENTORS
TEYNHAM WOODWARD
ARTHUR W VETTEL &
HENRY F SCANDRETT
BY James E. Toomey, agt.

Patented Jan. 27, 1948

2,434,976

UNITED STATES PATENT OFFICE 2,434,976

APPARATUS FOR EFFECTING HEAT EXCHANGE BETWEEN A GAS AND A LIQUID

Teynham Woodward, Del Monte, Arthur W. Vettel, Watsonville, and Henry F. Scandrett, Oakland, Calif., assignors, by mesne assignments, to The Permanente Metals Corporation, a corporation of Delaware Application October 2, 1944, Serial No. 556,756

5 Claims. (Cl. 261—121)

This application relates to an apparatus for effecting heat exchange between a gas and a liquid, and particularly to effecting exchange of heat by bringing into direct contact with each other the two mediums between which exchange takes place.

The invention herein disclosed has very general application in that it is readily adaptable to use with many combinations of immiscible fluids between which an exchange of heat is desired. It is, however, particularly adapted to one step of a process for manufacturing magnesia, or magnesium hydroxide, and will be described herein as so used though this description is for the purpose of illustrating the invention and is not to be taken as limiting the invention to the particular use selected for the purpose of illustration.

In the production of magnesium hydroxide, by the reaction of a liquid containing convertible magnesium salts, such as seawater, brines or the like, and a lime-containing material, such as dolomite or the like, the salt-containing liquid is brought into contact with the lime thereby forming a sludge of magnesium hydroxide which is recoverable by filtration. In this way, the magnesium hydroxide can be separated from the other constituents of the reacted mixture. However, the filtration of this finely divided sludge material is a slow and rather expensive operation.

The rate of filtration and the capacity of filter equipment can be increased by heating the material to be filtered. Advantageously, the liquid, such as sludge material, can be heated with stack gases, particularly those resulting from the calcining of magnesium hydroxide filter cake. Stack gases are a convenient and inexpensive source of heat and serve to raise the temperature of the sludge material and simultaneously to bring into contact therewith carbon dioxide gas. Carbon dioxide when thus added to the sludge material in small amounts also has a beneficial effect upon the filtration rate.

It is therefore an object of this invention to provide an apparatus for effecting efficient exchange of heat between a gas and a liquid by bringing the gas into direct contact with the liquid. It is another object to provide an apparatus for introducing into a magnesium hydroxide sludge which is to be filtered the proper amount of carbon dioxide gas to facilitate filtration thereof. Other and more specific objects of the invention are made apparent in the following specification wherein a preferred form thereof is described in detail and with reference to the accompanying drawings.

The term "liquid" as used herein is intended to mean any liquid-like substances including sludges, slurries, and other suspensions of solids in liquid.

In treating magnesium hydroxide sludge to increase filterability thereof, as one application of the process of this invention, heated gases containing carbon dioxide are brought into contact with the sludge. When the heated gases are stack gases from sludge calcining, they generally contain about 15% of $CO_2$ on a dry basis. These gases issue from the operation wherein a magnesium hydroxide sludge is calcined by direct contact with gases obtained by the combustion of fuel oil, but other hot gases are useful and it is advantageous to have a considerable content of water vapor and a relatively low carbon dioxide content.

The sludge is usually heated to a temperature below that of the dewpoint of the stack gases, which is about 70° C. In the case of gases from sludge calcining as described above, but is preferably heated to about 50° C. to attain the optimum effect of heating and of $CO_2$ absorption. In this method, the conversion of magnesia to the carbonate is avoided. Only sufficient carbon dioxide, for example, up to about two grams per liter of sludge, is absorbed to facilitate filtration, without effecting significant reaction with the magnesium hydroxide. The solids content of the filter cake obtained by the filtration of the sludge shows a slight decrease, indicating that some of the magnesium hydroxide, possibly the finest particles of the sludge, are carbonated, but this effect is maintained at a minimum by this process. It is believed that the presence of the small amounts of carbon dioxide added by this method may change the viscosity of the liquid to permit more rapid filtration and separation, but the mechanism of the action is not precisely known.

It is an advantage of this process, in addition to the advantages shown above, that carbon dioxide addition effects the recovery of a more highly purified magnesium hydroxide sludge. The fine particles of magnesium hydroxide formed by precipitation thereof in an aqueous medium are highly adsorbent, for example, toward ions and therefore take up, for instance, chloride and sulfate ions. It has heretofore been impossible to remove these absorbed ions by washing by the processes known to the art. It has now been found, however, that the treatment of the sludge with a gas containing carbon dioxide effects desorption of these ions and the final washed filter cake recovered by filtering the sludge and washing with water is highly purified with respect to these adsorbed substances.

As an example of the process of this invention, with respect to treating magnesium hydroxide sludge, seawater is brought into contact with calcined dolomite to produce a magnesium hydroxide precipitate by a method well-known to the art. The magnesium hydroxide sludge is washed by counter-current decantation and is then treated with stack gases in a preferred form of apparatus as more fully described below with reference to the drawings, and the treated sludge is finally filtered to recover a magnesium hydroxide filter cake, which may then be processed further as desired.

Figure 4:
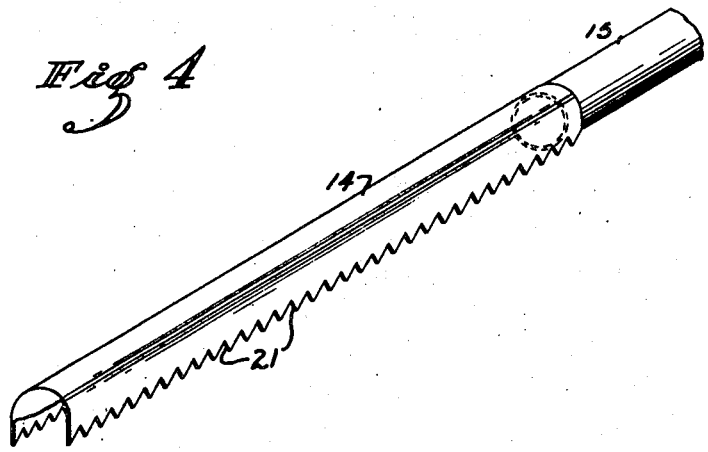
Figure 5:
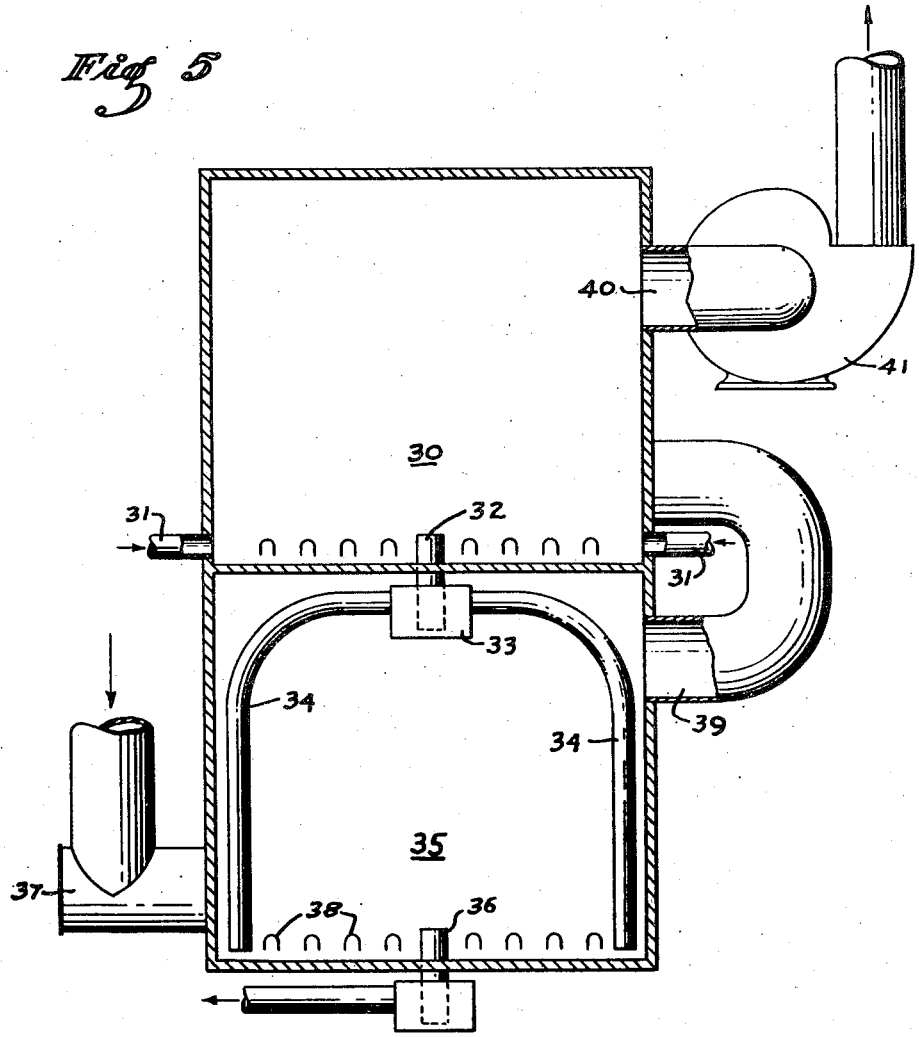

In the drawings:

Figure 1 is a vertical longitudinal section taken through an apparatus embodying the present invention. Figure 2 is a plan view of the same apparatus with a portion of the top broken away. Figure 3 is a transverse sectional view taken on line III—III of Figure 1 and Figure 4 is an enlarged isometric view of one of the gas dispensers which form a part of the apparatus shown in the other figures of the drawings. Figure 5 is a schematic drawing of a multiple-stage heat exchanger according to this invention.

Referring to the drawings in detail a large rectangular tank 10 is shown as a treating chamber. This tank is preferably of substantially gas-tight construction and may be made either of metal or suitably braced wood such as heavy redwood planks. The tank, in the process specifically described is usually under a vacuum of about five to seven inches of water. Sludge to be treated is passed through the tank continuously to maintain a liquid level therein several inches above the bottom. The sludge enters through pipes 11 disposed centrally and toward the ends of the bottom of the tank and flows toward the stand pipes 12, located about midway between the ends and the central portion of the bottom of the tank. The height of the pipes 12 determines the liquid level in the tank. As the level of the liquid is a controlling factor in the treating process, it is preferable that the height of the stand pipes be adjustable as, for example, by couplings 13 threaded to the ends of the pipes or other means capable of manipulation to vary the effective height of the stand pipes through which the liquid sludge overflows.

It is possible to reverse or otherwise change the positions of the sludge inlet pipes and stand pipes, but it is preferred for maximum efficiency of contact that the flow of sludge be maintained evenly over the surface of the tank bottom. The arrangement shown here enables such effect, although other means may be employed to obtain such even flow.

As the sludge flows through the tank the hot gas which, in the present example, is stack gas from the operation of calcining magnesium hydroxide filter cake and which is to be used to heat and otherwise treat the sludge by direct contact therewith, is admitted adjacent the bottom of the tank and is caused to bubble or pass upwardly in a diffused state through the sludge. It is desirable that the gas in passing through the liquid be spread throughout substantially the entire area of the tank, that it be finely diffused or broken up to effect a large area of surface contact between the fluids, and that it pass through the liquid sludge to produce a uniform ebullient action rather than the relatively high state of agitation that would result from directing the gas through the liquid by means of small jets of under high pressure. These requirements are met by the apparatus disclosed.

The apparatus comprises a plurality of inverted trough shaped gas dispensers 14, the construction of which is best shown in Figure 4 of the drawings. The gas dispensers 14 extend across the tank in a common plane near its bottom and each of them comprises an inverted channel or trough which may be formed of sheet metal or the like and which is welded or otherwise suitably secured to a pipe 15, which, as best shown in Figures 2 and 3, extends through the wall of the tank 10 and connects with a manifold 16 supplied with gas through a conduit 17 which conduit connects with the stack, not shown, from which the gas is drawn. A valve or damper 18 is advantageously placed in the discharge line and may be used for the purpose of controlling the amount of gas travelling therethrough. The pipes 15 are connected with the manifold as illustrated in Figure 3 through connecting pipes 19 and the ends of the pipes 15 are continued outwardly and terminate in removable caps, such as indicated at 20, to facilitate the removal of dust and carbon which may be excessively deposited in them by the stack gases. Through this arrangement it is possible to inspect and clean the interior of the pipes 15 without interrupting the continuous operation of the apparatus where the pipes 15 penetrate the wall of the tank 10. Ordinarily the dust is prevented from depositing in the pipes by a water-spray which is continuously drawn into the pipes by the Venturi effect of the stack gases passing therethrough. Pipes 28 project upwardly into the ends of pipes 15, and through the walls thereof, conduct small streams of water into pipes 15. By the action of the stack gases these streams are converted into water sprays which effectively wash away the dusts from the interior walls of the pipes, thereby reducing the necessity for manual cleaning and also preventing corrosion of the pipes by the materials in contact with them. The pipes are, of course, sealed against leakage of the contents of the tank and in the event the tank is made of wood some heat insulation such as asbestos packing, not shown, is preferably employed to separate the pipes from contact with the wood so as to prevent charring of the latter due to its continuous exposure to the heat of the gas carried by the pipes. Referring again to the gas dispersing members 14, as illustrated in Figure 4, the lower edges of the inverted channels which form these members are serrated to provide a series of inverted V-shaped notches 21 which cause the gas to escape in streams of small bubbles and to pass upwardly through the sludge in a finely divided or diffused state. That end of the channel opposite to its point of connection with the pipe 15 is closed. In an alternative construction, the gas disperser may extend through the wall of the tank opposite the entry and be suitably sealed off with a removable cap which can be taken off to permit inspection or cleaning. Preferably from three to five gas dispersers are disposed in the path of flow between an inlet zone and the corresponding outlet zone.

Blocks 27 are placed between parallel gas dispersers 14, suitably in a staggered relationship as shown in Figure 2, and act to prevent surging or wave formation along the sludge body. The flow of sludge should be maintained evenly, as stated above, by reason of the circumstance that gases passing therethrough will tend to take the shortest path through the sludge, that is, they will pass through the sludge and issue therefrom in the trough of the wave, effecting shorter contact time and lowered efficiency. The blocks 27 prevent or break up the development of waves and enable increased efficiency of contact.

The treated sludge is drawn off through stand pipes 12 and passes into a trap 29 and thence to a storage tank not shown from which it is rapidly pumped to the filters.

The gas which enters through the dispersers and passes upwardly through the sludge into the upper portion of the tank 10 is drawn off through a conduit 22 by a suction fan 23 driven through a pulley 24 by a motor or the like, not shown. Preferably a spray trap 25 and baffle 42 are interposed between the tank and the gas discharge conduit 22 to prevent carry over of spray to the fan and build up of any deposit. The gases return to the stack, or other point of discharge, through an exhaust conduit 26 of the suction fan 23. While it is apparent that the suction fan in the gas discharge conduit could be replaced by a blower at the feed end the arrangement shown is preferred in that the gas handled by the fan is considerably cooler after its contact with sludge. In the particular process here described, the stack gas enters the sludge at a temperature of about 250 to 300° C. and is discharged from the treating tank at a temperature of about 50 to 60° C. Furthermore, the volume of gas handled by the fan at the discharge end is considerably less because a large part of the available heat in such stack gases is due to the latent heat of water vapor which they contain. Condensation of this vapor to liquid in the sludge greatly reduces the volume of the gas.

One of the advantages of the method and apparatus herein described resides in the fact that the gas passes through a relatively small body of sludge so that the pressure drop through the apparatus is relatively small but the efficiency of heat exchange is exceedingly high. In practice the level of the sludge in the tank is maintained at about five or six inches above the bottom of the gas dispersers and under the conditions described it has been demonstrated that the temperature of the gases leaving the heat exchange operation is less than 2° C. above the temperature of the sludge. Thus, a very high degree of efficiency has been obtained by the practice of this invention with relatively simple mechanism constructed at a low cost and capable of continuous operation. A deeper body of liquid may be maintained, but as the depth increases the efficiency of the process becomes less and it is preferred to operate with a shallow body of liquid.

In another embodiment of the method and apparatus of this invention, a multiple stage heat exchanger is employed. As an example of this, Figure 5 shows a schematic diagram of such a device. In this figure, a two-stage heat exchanger is shown. The sludge to be treated is led in on the upper level 30 through pipes 31 and flows across 30 to the outlet or stand pipe 32. Through 32 the sludge, partially treated, passes down to an overflow pan 33 and then is led out by conduits 34 to lower level 35, over which it flows to outlet or stand pipe 36 whence it is removed and goes to the filters. Stack gases are led in through a manifold 37, pass through gas dispersers 38, bubble through the partially treated sludge on level 35, and are drawn off at 39 and conducted to a similar series of gas dispersers on level 30. The gases pass through the fresh sludge, giving up residual heat thereto and are drawn off at 40 and pass to the stack. The gases are drawn through the system by pump 41 also advantageously disposed at the outlet zone for the gases. The efficiency of the process is still further increased by the multiple stage exchanger which, although described with respect to a two-stage device, may have more than two series of exchangers.

The apparatus and process of this invention are also useful in many other applications than that described, as for example, in pre-heating seawater in the seawater process for making magnesium hydroxide, or in pre-heating wash-water in other processes, such as in mining operations and the like and are not intended to be limited to the preparation of any particular material.

It is an advantageous effect of this invention that rate of filtration and thereby the capacity of the filter equipment is increased, in treating difficulty filterable materials. It is a further advantage of this invention that it provides a method and device whereby the dust carried by the stack gases is removed therefrom. Stack gases from the calination of filter cake as described above contain a significant amount of MgO dust particles. This MgO dust is recovered from the gases by the process and apparatus of this invention, thereby reducing incidental losses of MgO, in the processing of magnesium hydroxide sludge.

What is claimed is:

1. In an apparatus of the character described, a tank, means for delivering a liquid into the central bottom portion thereof and into the bottom portions adjacent the ends of the tank, overflow stand pipes midway between the pairs of the said central and end inlet means to maintain a shallow, uniformly distributed flow of liquid over the bottom of the tank, channel gas dispersers having serrated lower edges and disposed adjacent the bottom of the tank to admit gas into the body of the liquid, at least one end of each of said gas dispersers terminating outside of said tank and being sealed off by a removable cap, means disposed on the bottom of the tank between said gas dispersers to prevent wave formation in the flowing liquid, and means for maintaining a reduced pressure over the surface of the liquid in the tank to induce the gas to flow through the liquid.

2. In an apparatus of the character described, a tank, means for delivering liquid into the central bottom portion thereof and into the bottom portion adjacent the ends of the tank, overflow stand pipes midway between the pairs of the said central and end inlet means to maintain a shallow, uniformly distributed flow of liquid over the bottom of the tank, channel gas dispersers having serrated lower edges and disposed adjacent the bottom of the tank to admit gas into the body of the liquid, at least one end of each of said gas dispersers terminating outside of said tank and being sealed off by a removable cap, means disposed on the bottom of the tank between the gas dispersers to prevent wave formation in the flowing sludge, a gas exhaust conduit above the liquid level in the tank, a suction fan in said conduit, and a spray trap chamber interposed between said conduit and the interior of the tank.

3. In an apparatus of the character described, a tank, means for delivering liquid into the central bottom portion thereof and into the bottom portions adjacent the ends of the tank, overflow stand pipes midway between the pairs of the said central and end inlet means to maintain a shallow, uniformly distributed flow of liquid over the bottom of the tank, channel gas dispersers having serrated lower edges and disposed adjacent the bottom of the tank to admit gas into the body of the liquid, at least one end of each of said gas dispersers terminating outside of said tank and being sealed off by a removable cap, blocks disposed on the bottom of the tank between the gas dispersers to prevent wave formation in the flowing sludge, a gas exhaust conduit above the liquid level in the tank, and a suction fan in said conduit.

4. An apparatus for effecting exchange of heat between stack gases and magnesium hydroxide sludge which comprises a tank, means for maintaining a uniformly distributed flow of liquid at a constant level through said tank, gas-admitting means including channel gas dispersers having serrated lower edges for introducing gas to within said sludge adjacent the bottom of the tank, at least one end of each of said gas dispersers terminating outside of said tank and being sealed off by a removable cap, water-spray means adjacent to said gas-admitting means and actuated by the gas flow for washing dust from the interior walls of said gas-admitting means into the liquid, and means for maintaining a reduced pressure over the surface of the liquid in the tank to induce the gas to flow through the liquid.

5. An apparatus for effecting exchange of heat between stack gases and magnesium hydroxide sludge which comprises a tank, means for delivering said sludge into the central bottom portion thereof and into the bottom portions adjacent the ends of the tank, overflow stand pipes midway between the pairs of the said central and end inlet means to maintain a shallow, uniformly distributed flow of sludge over the bottom of the tank, gas-admitting means including channel gas dispersers having serrated lower edges and disposed adjacent the bottom of the tank to admit said stack gases into the body of the liquid, at least one end of each of said gas dispersers terminating outside of said tank and being sealed off by a removable cap, blocks disposed on the bottom of the tank between said gas dispersers to prevent wave formation in the flowing sludge, water-spray means adjacent to said gas-admitting means and actuated by the gas flow for washing dust from the interior walls of said gas-admitting means into the sludge, a gas exhaust conduit above the liquid level in the tank, a suction fan in said conduit, and a spray trap chamber interposed between said conduit and the interior of the tank.

TEYNHAM WOODWARD.
ARTHUR W. VETTEL.
HENRY F. SCANDRETT.

REFERENCES CITED

The following references are of record in the file of this patent:

UNITED STATES PATENTS

| Number | Name | Date |
|---|---|---|
| 2,070,067 | Rice | Feb. 9, 1937 |
| 1,236,581 | McGrath | Aug. 14, 1917 |
| 1,639,709 | Still | Aug. 23, 1927 |
| 2,273,178 | Collins | Feb. 17, 1942 |
| 2,231,965 | Stump | Feb. 18, 1941 |
| 2,090,994 | Brandes | Aug. 24, 1937 |
| 1,939,949 | Bertram | Dec. 19, 1933 |
| 1,098,190 | Stone | May 26, 1914 |
| 1,938,247 | Collins | Dec. 5, 1933 |
| 575,370 | Parks | Jan. 19, 1897 |
| 889,694 | Lambert | June 2, 1908 |